(12) United States Patent  (10) Patent No.: US 8,113,362 B2
Stommel  (45) Date of Patent: Feb. 14, 2012

(54) METHOD FOR LIFTING OF COMPONENTS OF WIND ENERGY INSTALLATIONS

(75) Inventor: Matthias Stommel, Ganderkesee (DE)

(73) Assignee: Daubner & Stommel GbR Bau-Werk-Planung, Ganderkesee (DE)

( * ) Notice: Subject to any disclaimer, the term of this patent is extended or adjusted under 35 U.S.C. 154(b) by 168 days.

(21) Appl. No.: 12/555,260

(22) Filed: Sep. 8, 2009

(65) Prior Publication Data

US 2010/0065524 A1  Mar. 18, 2010

(30) Foreign Application Priority Data

Sep. 15, 2008 (DE) .................. 10 2008 047 341

(51) Int. Cl.
*B66C 23/00* (2006.01)
(52) U.S. Cl. ...................................... 212/167
(58) Field of Classification Search ............ 212/167
See application file for complete search history.

(56) References Cited

U.S. PATENT DOCUMENTS

2008/0282590 A1* 11/2008 Wobben .................. 40/584

FOREIGN PATENT DOCUMENTS

| DE | 100 28 513 | | 1/2002 |
| DE | 100 28 513 | A1 | 1/2002 |
| DE | 10 2004 056 340 | A1 | 5/2006 |
| DE | 10 2004 056340 | | 5/2006 |
| DE | 601 29 237 | T2 | 10/2007 |
| EP | 1 748 186 | A * | 1/2007 |
| JP | 2000 204792 | | 7/2000 |
| JP | 2002-147340 | A * | 5/2002 |
| WO | WO 02/34664 | | 5/2002 |
| WO | WO 03/100249 | | 12/2003 |

OTHER PUBLICATIONS

German Search Report corresponding to German application No. 10 2008 047 341.3 filed on Sep. 19, 2008.

* cited by examiner

*Primary Examiner* — Emmanuel M Marcelo
(74) *Attorney, Agent, or Firm* — Laurence P. Colton; Smith Risley Tempel Santos LLC

(57) ABSTRACT

A method for lifting of components of a wind energy installation (10) to an installation height, in which a hoisting means (26) of a first hoisting device (20) is guided starting from a hoisting means drive (24), which is arranged close to the ground, along a deflection means (30), which is arranged in the area of the tower head of the wind energy installation (10), in particular in the area of the pod, and is associated with the first hoisting device (20), to a component (18) which is arranged on the ground or close to the ground, and is attached to said component (18), in particular in the area of the component center of gravity or close to the center of gravity; a hoisting means (36, 48) of a second hoisting device (22) is guided starting from a hoisting means drive of this second hoisting device (22) along a free end (34, 46), which is arranged above the deflection means (30) of the first hoisting device (20), of a crane jib (32, 44) downwards to the component (18), and is attached there further outwards relative to the center of gravity of the component than the hoisting means (26) of the first hoisting device (20), preferably in an upper area of the component (18) when the component (18) is in the installed state; and the component (18) is then lifted to the required installation height with the aid of the two hoisting means (26, 36, 48) of the hoisting devices (20, 22).

13 Claims, 4 Drawing Sheets

Fig. 3
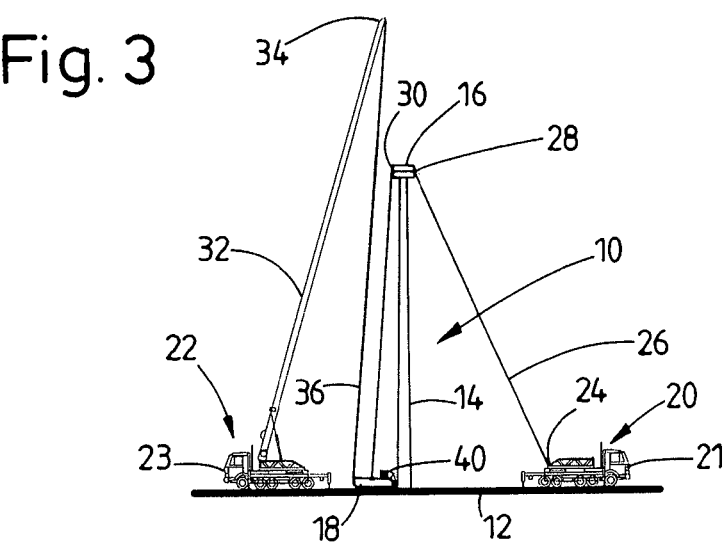
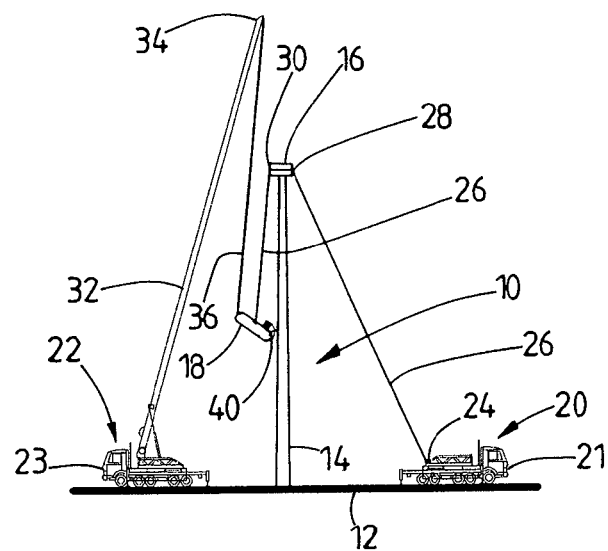
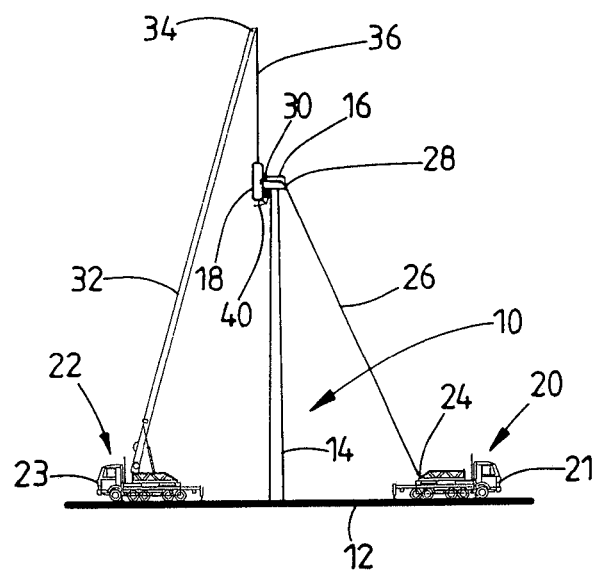

Fig. 4
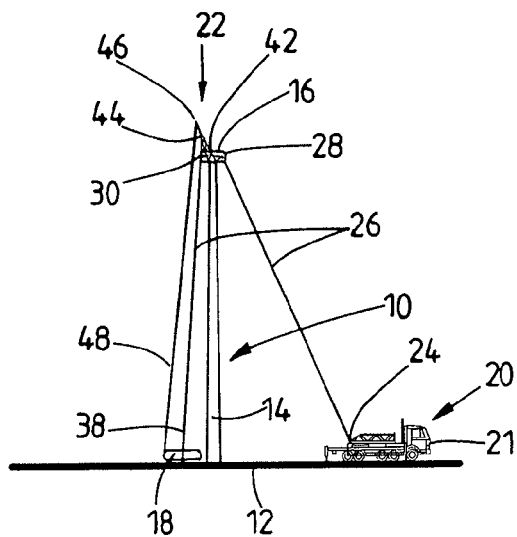
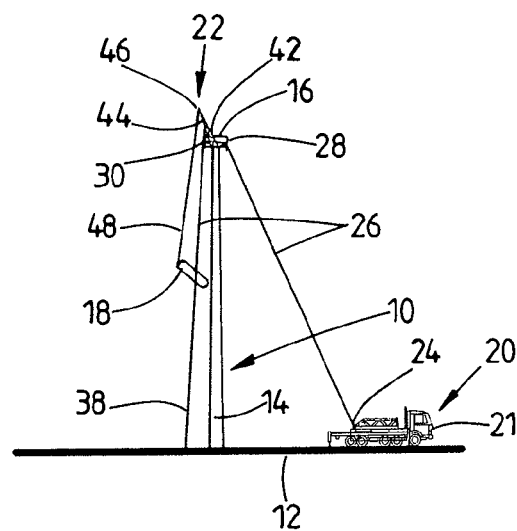
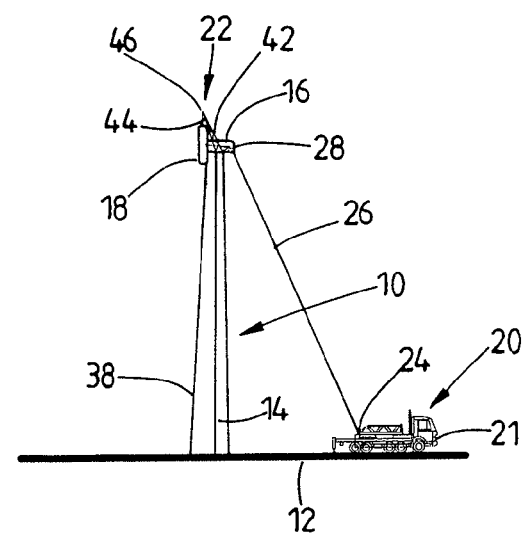

METHOD FOR LIFTING OF COMPONENTS OF WIND ENERGY INSTALLATIONS

STATEMENT OF RELATED APPLICATIONS

This application is based on and claims the benefit under 35 USC 119(a)-(d) or (f), or 365(b) of German Patent Application No. DE 10 2008 047 341.3 having a filing date of 15 Sep. 2008, which is incorporated herein in its entirety by this reference.

BACKGROUND OF THE INVENTION

1. Technical Field

The present invention relates to a method for lifting of components of a wind energy installation to the installation height.

2. Prior Art

It is known that the dimensions of modern wind energy installations are becoming ever larger. Some wind energy installations are being installed with hub heights of well over a hundred metres. These dimensions result in various difficulties.

One particular problem is that the individual components of the wind energy installation, for example the generator, must be lifted to the required installation height when the installation is being installed. It is known for heavy-lift cranes or large cranes to be used for this purpose, whose jibs have a considerable length and are designed for considerable forces. The costs which are incurred for the use of such cranes are immense.

It is also known for a lifting device to be installed in the area of the tower head of the wind energy installation, in particular on the machine support. This in general has a winch, onto which a hoisting cable is wound. This hoisting cable is let out downwards until it is close to the ground, when required. There, components to be lifted are connected to the cable, and are then lifted up by winding the cable onto the winch.

However, the maximum lifting height of these lifting devices is in general not sufficient to lift large components, which must be positioned adjacent to or on the machine support of the wind energy installation, for example the installation generator, to the required installation height. This is because the lifting height of a lifting device such as this is generally limited or defined by deflection rollers over which the respective hoisting cable is let out downwards. These deflection rollers are normally attached to the machine support. Since the uppermost areas of the component to be lifted can at best be lifted to immediately below the deflection roller, it is not possible to lift the component or at least subareas of it to installation heights above the machine support. By way of example, a ring generator must be connected to a shaft journal, which is mounted on the machine support, when the installation is being installed. For this purpose, the ring generator must first of all be pushed centrally onto the shaft journal. In order to allow it to be pushed onto the shaft journal, the ring generator must first of all be raised to a corresponding installation height centrally in the axial direction in front of the shaft journal. During this process, the upper areas of the ring generator must correspondingly be moved to a height above the shaft journal, and therefore above the machine support. This cannot be done using the described lifting device.

In order to improve the lifting height of the described lifting devices which are arranged on the machine support, complex crane devices are in some cases installed according to the prior art on the machine support, which have crane jibs directed obliquely upwards. In this case, this adds only the height between the free end of the crane jib on the one hand and the machine support on the other hand to the lifting height. However, a crane jib which is directed obliquely upwards such as this is subject to the problem that it has to support considerable loads and withstand considerable forces while large components are being lifted. This in turn requires installations whose costs even exceed the costs of a mobile heavy-load crane or large crane arranged on the ground.

BRIEF SUMMARY OF THE INVENTION

Against the background of this prior art, the object of the present invention is to specify a method for lifting of components of a wind energy installation, by means of which, in particular, large components can be lifted up to the required installation height in a manner which is as effective and cost-saving as possible.

This object is achieved by a method having the features of:

Firstly, a hoisting means of a first hoisting device is guided starting from a hoisting means drive, which is arranged close to the ground, along a deflection means, which is arranged in the area of the tower head of the wind energy installation, in particular in the area of the pod, and is associated with the first hoisting device, to a component which is arranged on the ground or close to the ground, and is attached to said component, in particular in the area of the component center of gravity or close to the center of gravity.

A hoisting means of a second hoisting device is guided starting from a hoisting means drive of this second hoisting device along a free end, which is arranged above the deflection means of the first hoisting device, of a crane jib downwards to the component, and is attached there further outwards relative to the center of gravity of the component than the hoisting means of the first hoisting device, preferably in an upper area of the component when the component is in the installed state, particularly preferably at the highest point or area of the component.

The component is then lifted to the required installation height with the aid of the two hoisting means of the hoisting devices.

Accordingly, at least two hoisting devices are used according to the invention. The (maximum) lifting height of the second hoisting device is in this case greater than the (maximum) lifting height of the first hoisting device.

In the preferred embodiment of the invention, the first lifting device supports the main load of the component to be lifted. The second hoisting device may in this case be used on the one hand for guidance of the component during the lifting process, in particular in order to avoid tower collisions. The attachment of the hoisting means of the second hoisting device further outwards or further away from the center of gravity than the hoisting means of the first hoisting device on the other hand ensures, however, that the component can be pivoted to an installation position at the latest at the installation height by the second hoisting device, or the second hoisting means, by using its greater lifting height.

In this case, even during the pivoting process, the main load is still supported by the first hoisting device, since the second hoisting device has to transmit essentially (only) a torque to the component. The method according to the invention therefore means that that load which the crane jib of the second hoisting device has to support can be kept comparatively low.

The component is preferably lifted up through at least a part of the lifting movement in a transport position in which hoisting is carried out at the same or approximately the same hoisting speed on both hoisting means. Later on, the component is rotated or pivoted from the transport position to the installation position. This can be done by a second hoisting device hoisting the component at a higher hoisting speed than the first hoisting device.

In general, the pivoting or rotation of the component to the installation position is carried out only once the component has already at least approximately reached the required installation height. The speed of the hoisting means of the first hoisting device is then preferably reduced to zero, while the hoisting means of the second hoisting device continues to hoist the component. The component is then correspondingly pivoted. If, for example, the hoisting means of the second hoisting device is attached directly to an outer edge of the component, this hoisting means can be wound up onto a corresponding winch, with the component in consequence being pivoted, until this outer edge points appropriately upwards.

As an alternative to the above procedure, it is, of course, in principle also feasible to match the hoisting means speed of the first hoisting device on the one hand and the hoisting means speed of the second hoisting device on the other hand to one another throughout the entire time period of the lifting movement, or through a relatively long time period of the lifting movement, such that the component is moved more or less smoothly from a transport position to the installation position. In this case, the hoisting means speed of the second hoisting device which is guiding the component has to be correspondingly a little bit greater during this time period than the hoisting means speed of the first hoisting device.

The crane jib of the second hoisting device is advantageously part of a mobile crane which is arranged close to the ground or on the ground and is used temporarily for the lifting processes. Since the crane jib has to lift only a (minor) proportion of the weight of the component, there is no need to use particularly costly large cranes which are designed for the total weight of the component.

In addition, if the crane jib is alternatively installed directly as part of the wind energy installation, in its upper area, in general on the machine support, the corresponding installations can advantageously be designed only for the comparatively small proportion of the weight of the component.

In a further development of the invention, the hoisting means drive of the first hoisting device is a winch. This winch was in general arranged on a vehicle, for example a winch vehicle or a crane vehicle, whose jib remains retracted throughout the course of the lifting method according to the invention. Alternatively, however, it is also feasible to permanently install the winch at the foot of the wind energy installation.

The hoisting means of the second hoisting device can be used to prevent the component from colliding with the normally conical tower of the wind energy installation during the lifting process. The second hoisting device in this case (also) carries out a guidance function during the lifting process.

However, the risk of collision can be reduced even further. For this purpose, according to a further aspect of the invention, a cable-like or chain-like guide means is guided in a stressed manner at least approximately as far as the ground, and is anchored there, starting from the upper area of the wind energy installation in which it is attached. The component to be lifted is then guided during the lifting process along the cable-like or chain-like guide means. This can be done by the component being guided along the cable-like or chain-like guide means by means of guide elements, which are or can be firmly connected to the component, such as eyes, hooks or the like.

Alternatively or additionally, it is possible to provide for a preferably elastic spacer to be attached to the component to be lifted, which spacer rests on the tower, and damps collision movements, in the event of a collision during the lifting process, or else throughout the entire lifting process. It is furthermore feasible to attach a rail-like component to the tower, from top to bottom, in which guide elements engage, specifically opposing pieces which are connected to the component to be lifted. In this case, the rail is used as a guide rail, thus precluding undesirable oscillating movements of the component or the like during the lifting process.

BRIEF DESCRIPTION OF THE DRAWINGS

Further features of the invention will become evident from the attached dependent claims, from the following description of preferred exemplary embodiments of the invention, and from the attached drawings, in which:

FIG. 3 shows a further embodiment of the method according to the invention, as outline sketches, and FIG. 4 shows a further embodiment of the method according to the invention, as outline sketches.

DETAILED DESCRIPTION OF PREFERRED EMBODIMENTS

Figure 1:
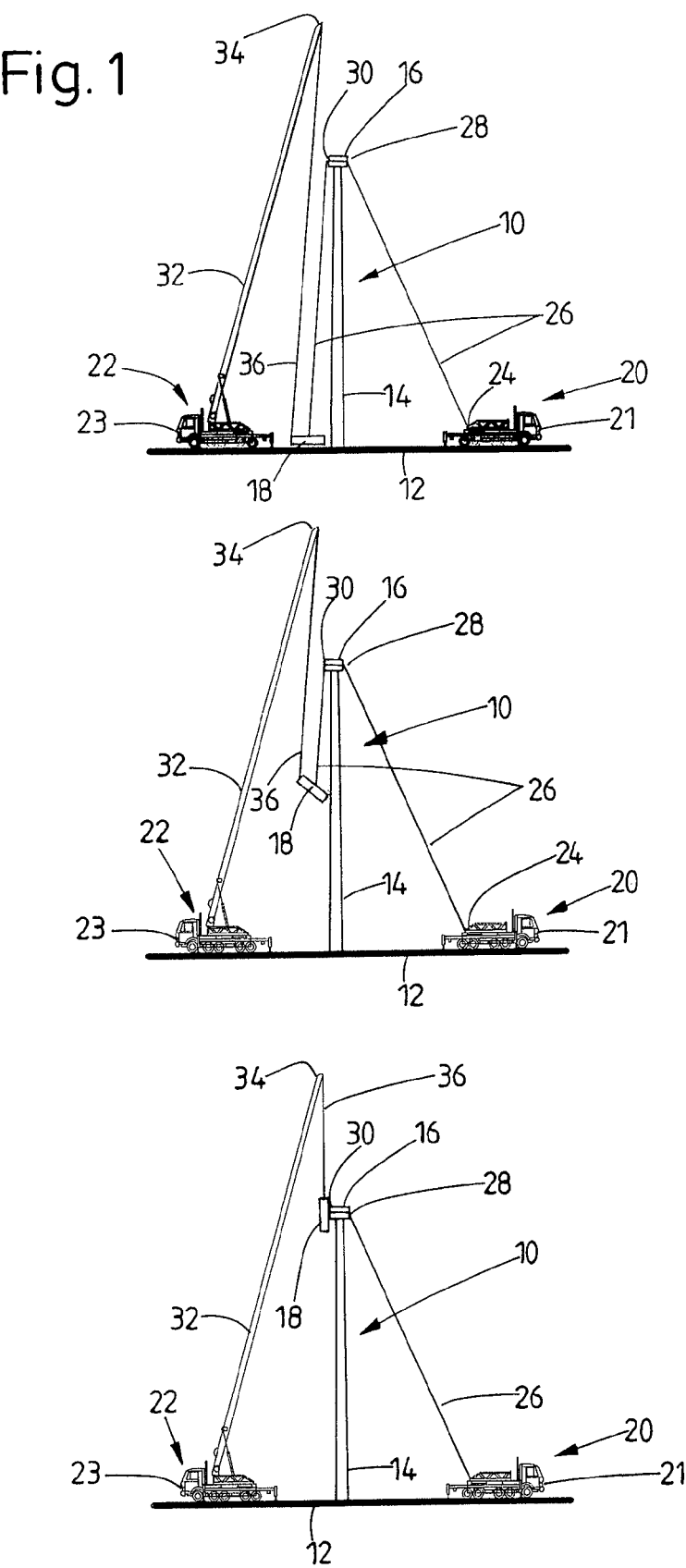
FIG. 1 shows a first embodiment of the method according to the invention at three different times, as outline sketches.

Each of the three drawings in FIG. 1 shows a so-called wind energy installation 10, which is being constructed and is known per se from the prior art. This wind energy installation 10 has a tower 14 arranged on horizontal ground 12. A conventional pod 16 or the machine house 16 of the wind energy installation 10 has already been installed on the tower head. After completion of the wind energy installation 10, this installation will have a rotor with three rotor blades which, driven by the wind, drives a generator in order to produce electrical power.

At the installation times illustrated in the drawings, various large components of the installation still need to be installed. The installation of a ring generator 18 is illustrated schematically in the present case.

At the time shown in the upper drawing in FIG. 1, the ring generator 18 is still located at the foot of the tower 14. During the course of the installation process—as is known from the prior art—it must be connected to a shaft journal arranged within the pod 16, or must be pushed onto this shaft journal. To do this, it is first of all necessary to lift the ring generator 18 to the required installation height.

In the upper drawing in FIG. 1, the ring generator 18 is resting flat on the ground, with its center axis pointing vertically upwards. According to the invention, two hoisting devices 20, 22 are used to lift the ring generator 18 to the required installation height:

The first hoisting device 20 has a winch vehicle 21, which is arranged on one side of the tower and has a winch 24. In this case, the winch vehicle 21 is arranged on the side facing the rear of the pod, that is to say on the side remote from the rotor which will be installed later. Starting from the winch 24, a cable-like or chain-like hoisting means 26, in this case a hoisting cable, leads to the pod 16.

Two deflection rollers 28, 30 of the hoisting device 20, over which the hoisting cable 26 is passed, are arranged within the pod 16, specifically on a machine support which is not illustrated. In this case, the deflection roller 28 is arranged at the rear end of the pod 16, and the deflection roller 30 is arranged at the front end of the pod 16. The two deflection rollers 28, 30 are attached directly to the machine support.

In other words, the cable 26 is guided along the deflection roller 28 to the front part of the pod 16, starting from the rear pod end. At the front part of the pod 16, the hoisting cable 26 is passed out of the pod 16 along the deflection roller 30, to be precise downwards, and is passed to the ring generator 18, which is arranged on the ground. There, the hoisting cable 26 is finally attached by suitable attachment means to the center of gravity of the ring generator 18, or slightly below the center of gravity.

The second hoisting device 22 comprises a crane vehicle 23 which, with respect to the tower 14, is positioned on the opposite side of the tower to the winch vehicle 21. The crane vehicle 23 is therefore arranged on the side of the tower 14 facing the front of the pod.

The crane vehicle 23 has a telescopic jib 32 which, in the drawings in FIG. 1, has already been extended so far obliquely upwards in the direction of the tower head top or of the pod 16 that its free end 34 is located some metres above the deflection roller 30 of the first hoisting device 20.

A hoisting means 36, specifically likewise a hoisting cable, is guided by means of a winch, which is not illustrated explicitly, of the crane 23 along the free end 34 of the jib 32 downwards to the ring generator 18. For this purpose, a deflection roller which is not illustrated but over which the hoisting cable is guided downwards, is arranged in the area of the free end 34 of the jib 32.

Overall, this arrangement automatically results in the second hoisting device 22 having a greater maximum lifting height than the first hoisting device 20. This is because the maximum lifting height of the first hoisting device is governed by the height at which the front deflection roller 30 is attached to the machine support while, in contrast, the maximum lifting height of the second hoisting device is governed by the height of the free end of the crane jib 32.

Finally, the hoisting cable 36 is likewise attached to the ring generator 18. In this case, the hoisting cable 36 is attached to the ring generator 18 further outwards, relative to the center of gravity of the ring generator 18, than the attachment of the hoisting cable 26. With respect to the subsequent installed state of the ring generator 18, the hoisting cable 36 is attached at that edge thereof which points upwards.

In order to lift the ring generator 18 in the exemplary embodiment shown in FIG. 1, both hoisting means drives of the hoisting devices 20, 22 are started up as far as possible at the same time, as a result of which the hoisting cables 26, 36 are wound onto the corresponding winches. As a result of the hoisting cable 26 attached, according to the invention, close to the center of gravity or directly below the center of gravity on the one hand, and the attachment of the hoisting cable 36 further outwards, on the other hand, the main load is supported by the first hoisting device 20 throughout the lifting process (central drawing in FIG. 1). Throughout the lifting process, the second hoisting device 22 or the crane vehicle 23 has to lift only a comparatively small proportion of the weight of the ring generator 18. Accordingly, the crane vehicle 23 need not be designed to support the total weight of the ring generator 18.

The central drawing in FIG. 1 shows the lifting process at a later time than the upper drawing. The component 18 has already been lifted to half the height of the tower 14. The ring generator 18 is in a position that is slightly inclined with respect to the horizontal. This has been achieved by the hoisting cable 36 having been hoisted upwards at a slightly higher speed at the start of the lifting process than the hoisting cable 26. The ring generator 18 is lifted up in this slightly inclined transport position until the installation height is approximately reached.

When the installation height has been approximately reached, the ring body 18 is pivoted such that its center axis is aligned coaxially with respect to the shaft journal (cf. the lower drawing in FIG. 1). Pivoting to the installation position is carried out by lifting the hoisting cable 36 up further with the hoisting cable 26 stationary, that is to say at rest. The hoisting cable 36 therefore rotates the ring body 18 to a position that is suitable for it to be pushed onto the shaft journal.

In a further embodiment of the invention, a guide cable 38 is additionally provided, and is guided from the front of the pod 16 in a stressed manner to the ground 12. The cable is attached at one end to the machine support, and at the other end is anchored in the ground 12. The guide cable 38 runs parallel to the hoisting cable 26, cf. FIG. 2. Only the front guide cable 38 can therefore be seen in drawings in FIG. 2, and the hoisting cable 26 arranged behind it is concealed by the former. The guide cable 38 has the function of guiding the ring body 18 while it is being lifted by the two hoisting cables 26, 36 such that the ring body 18 cannot collide with the tower 14. For this purpose, the ring body 18 has eyes or other guide elements which interact suitably with the guide cable 38. In the simplest embodiment, the ring body 18 has one or more suitable eyes, through which the guide cable 38 is passed.

Other measures are also feasible for avoiding collisions with the tower 14. The drawings in FIG. 3 show an elastic spacer 40 which is arranged between the ring body 18 and the tower 14 during the lifting process. The spacer 40 damps movements of the ring body 18 in the direction of the tower 14. The spacer 40 can be temporarily attached to the ring body 18. Alternatively or additionally, it is feasible to connect the spacer 40 to the tower 14 by means of a sliding connection. For example, the spacer 40 can be provided with suitable means which engage in a rail which runs from top to bottom on the tower 12. Various embodiments are feasible for this purpose.

Figure 2:
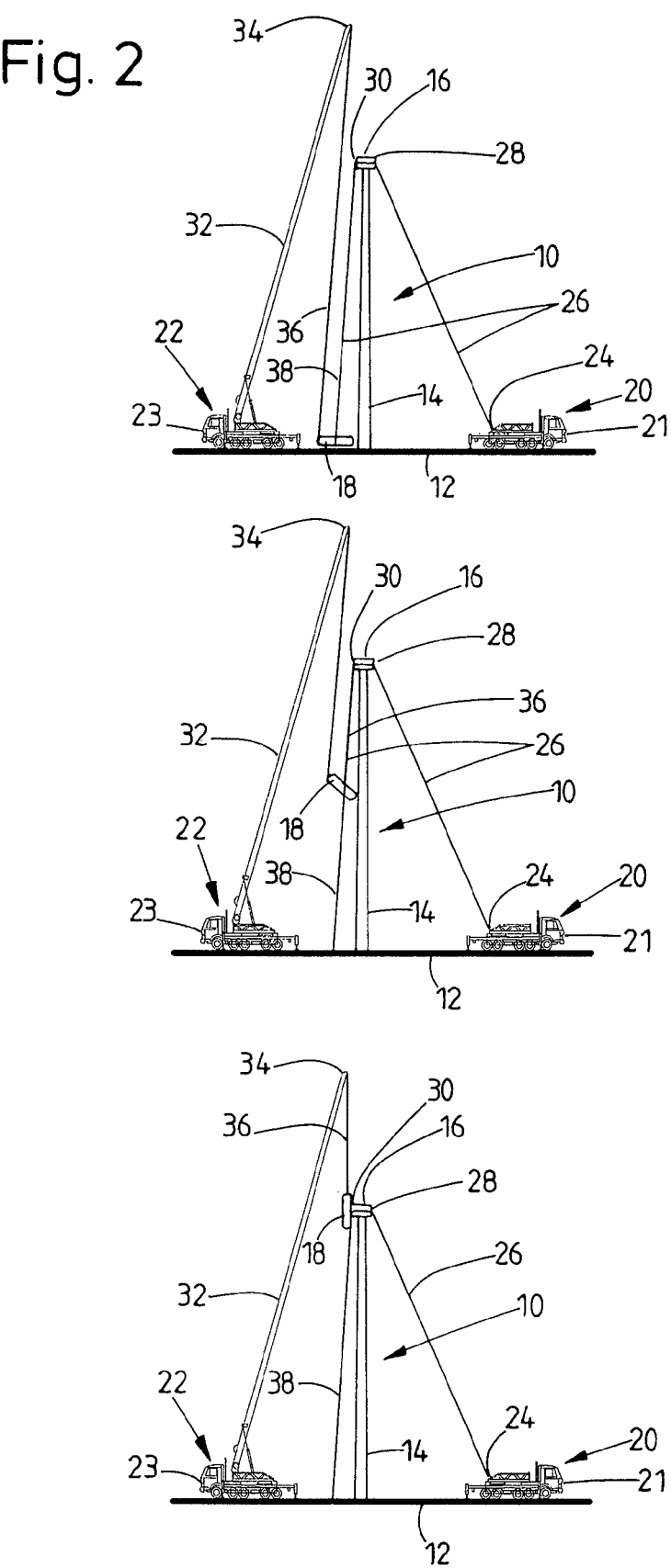
FIG. 2 shows a further embodiment of the method according to the invention, as outline sketches.

Finally, FIG. 4 shows an embodiment in which, in comparison to the embodiment shown in FIGS. 1 and 2, no mobile crane vehicle 23 is used. In this embodiment, the second hoisting device 22 comprises a crane 42 which is attached to the machine support in the area of the tower head of the wind energy installation 10. The crane 42 has a jib 44 which is directed obliquely upwards in the direction of the front of the pod, that is to say in the direction of the rotor which has not yet been installed. The free end 46 of the crane jib 44 is arranged in a similar manner to the free end 34 of the crane 23 according to the embodiments shown in FIGS. 1 and 2, above the deflection roller 30 of the first hoisting device 20. The crane 42 has a winch, which is not illustrated but onto which a corresponding hoisting cable 48 can be wound. In a similar manner to the hoisting cable 36 in FIG. 1, the hoisting cable 48 runs over the free end 46 of the jib 44 to the upper edge, with respect to the installed state of the ring body 18, thereof, where it is attached. Analogously to the embodiment shown in FIG. 1, the ring body 18 is in this case as well lifted up by two hoisting means devices 20 and 22, with the hoisting means device 20 supporting the main load. In contrast, the hoisting means device 22 is essentially responsible only for rotation of the ring body 18 to the final installation position.

LIST OF REFERENCE SYMBOLS

10 Wind energy installation
12 Ground
14 Tower
16 Pod
18 Ring generator
20 First hoisting device
21 Winch vehicle
22 Second hoisting device
23 Crane vehicle
24 Winch
26 Hoisting cable
28 Deflection roller
30 Deflection roller
32 Crane jib
34 Free end
36 Hoisting cable
38 Guide cable
40 Spacer
42 Crane
44 Crane jib
46 Free end
48 Hoisting cable

What is claimed is:

1. A method for lifting of components of a wind energy installation (10) to an installation height, comprising the steps of:
   guiding a hoisting means (26) of a first hoisting device (20) starting from a hoisting means drive (24), which is arranged close to the ground, along a deflection means (30), which is arranged within a pod in the area of a tower head of the wind energy installation (10) and which is associated with the first hoisting device (20), to a component (18) which is arranged on the ground or close to the ground, and the hoisting means (26) of the first hoisting device (20) is attached to the component (18) in the area of or close to the center of gravity of the component (18);
   guiding a hoisting means (36, 48) of a second hoisting device (22) starting from a hoisting means drive of the second hoisting device (22) along a free end (34, 46), which is arranged above the deflection means (30) associated with the first hoisting device (20), of a crane jib (32, 44) downwards to the component (18), and the hoisting means (36, 48) of the second hoisting device (22) is attached to the component (18) further outwards relative to the center of gravity of the component (18) than is the hoisting means (26) of the first hoisting device (20), the hoisting means (36, 48) of the second hoisting device (22) being attached to the component (18) in an upper area of the component (18) when the component (18) is in the installed state; and
   then lifting the component (18) to the required installation height with the aid of the hoisting means (26, 36, 48) of the hoisting devices (20, 22).

2. The method according to claim 1, further comprising lifting the component (18) up for at least a part of a lifting movement, the component (18) being hoisted in a transport position in which hoisting is carried out at the same or approximately the same hoisting speed on both of the hoisting means (26, 36, 48).

3. The method according to claim 2, further comprising rotating or pivoting the component (18) from the transport position to an installation position at the installation height, the rotating or pivoting being carried out by the second hoisting device (22) hoisting the component (18) at a faster hoisting speed than the first hoisting device (20).

4. The method according to claim 2, further comprising winding the hoisting means (26, 36, 48) of the first and/or of the second hoisting device (20, 22) onto a motor-driven cable winch in order to lift the component, wherein the hoisting means (26, 36, 48) is a cable or a chain.

5. The method according to claim 1, further comprising rotating or pivoting the component (18) from a transport position to an installation position at the installation height, the rotating or pivoting being carried out by the second hoisting device (22) hoisting the component (18) at a faster hoisting speed than the first hoisting device (20).

6. The method according to claim 5, further comprising winding the hoisting means (26, 36, 48) of the first and/or of the second hoisting device (20, 22) onto a motor-driven cable winch in order to lift the component, wherein the hoisting means (26, 36, 48) is a cable or a chain.

7. The method according to claim 1, further comprising winding the hoisting means (26, 36, 48) of the first and/or of the second hoisting device (20, 22) onto a motor-driven cable winch in order to lift the component, wherein the hoisting means (26, 36, 48) is a cable or a chain.

8. The method according to claim 1, further comprising arranging the hoisting means drive (24) of the first and/or of the second hoisting device (20, 22) on a vehicle (21, 23).

9. The method according to claim 1, further comprising guiding the hoisting means (36, 48) of the second hoisting device (22) along the free end (34, 46) of the crane jib (32, 44) of a mobile crane vehicle (23) or of a crane (42), which is arranged in the upper area of the wind energy installation (10), downwards to the component (18) by means of the deflection means which is arranged at the free end (34, 46) of the crane jib (32, 44).

10. The method according to claim 9, further comprising:
    guiding a guide means (38) in a stressed manner, starting from the pod (16) in the upper area of the wind energy installation (10), at least approximately as far as the ground (12), the guide means (38) being anchored at the ground (12); and
    guiding the component (18) along the guide means (38) during the lifting process, in order to reduce the risk of collision with a tower (14) of the wind energy installation (10), the guide means (38) being guided along the component (18) by guide elements which are firmly connected to the component (18).

11. The method according to claim 9, further comprising attaching a detachable, at least partially elastic spacer (40) at least to a side of the component (18) which is intended to face a tower (14) of the wind energy installation during the lifting process in order to reduce damage to the component (18) to be lifted caused by collisions between the component (18) and the tower (14) during the lifting process.

12. The method according to claim 1, further comprising:
    guiding a guide means (38) in a stressed manner, starting from the pod (16) in the upper area of the wind energy installation (10), at least approximately as far as the ground (12), the guide means (38) being anchored at the ground (12); and
    guiding the component (18) along the guide means (38) during the lifting process, in order to reduce the risk of collision with a tower (14) of the wind energy installation (10), the guide means (38) being guided along the component (18) by guide elements which are firmly connected to the component (18).

13. The method according to claim 1, further comprising attaching a detachable, at least partially elastic spacer (40) at least to a side of the component (18) which is intended to face a tower (14) of the wind energy installation during the lifting process in order to reduce damage to the component (18) to be lifted caused by collisions between the component (18) and the tower (14) during the lifting process.

\* \* \* \* \*